United States Patent

Von Holdt

[15] 3,642,418

[45] Feb. 15, 1972

[54] HEATED FEEDER SYSTEM FOR DIECASTING APPARATUS

[72] Inventor: John W. Von Holdt, 7430 N. Croname Road, Niles, Ill. 60648

[22] Filed: Apr. 29, 1970

[21] Appl. No.: 32,911

[52] U.S. Cl. .................................................. 425/447
[51] Int. Cl. ........................................................ B29f 1/03
[58] Field of Search ............ 18/12 SM, 12 SN, 30 SM, 30 SP, 18/30 SQ, 30 SR, 30 SS, 30 RM, 30 RC, 30 RH, 30 RP, 30 RV, 30 PM, 30 PP, 30 PT, 30 QT

[56] References Cited

UNITED STATES PATENTS

| | | | |
|---|---|---|---|
| 2,359,839 | 10/1944 | Goessling | 18/30 SP UX |
| 2,075,476 | 3/1937 | Sizer | 18/12 A UX |
| 3,091,812 | 6/1963 | Witkowski | 18/30 RH X |
| 3,055,055 | 9/1962 | Cook et al. | 18/30 RH X |
| 3,259,682 | 7/1966 | Neville et al. | 18/12 SM UX |
| 2,309,943 | 2/1943 | Ernst | 18/30 HB |

*Primary Examiner*—H. A. Kilby, Jr.
*Attorney*—Gary, Parker, Juettner, Pigott & Cullinan

[57] ABSTRACT

The present invention relates to a heated feeder system for feeding molten plastic material through a die to one or more mold cavities therein, including a heated feeder device in the nature of a screw comprising a rod having one or more spiral feeder passages formed on the outer surface thereof.

11 Claims, 17 Drawing Figures

PATENTED FEB 15 1972 3,642,418

Inventor
John W. von Holdt
By Gary, Parker, Juettner,
Pigott and Cullinan
Att'ys

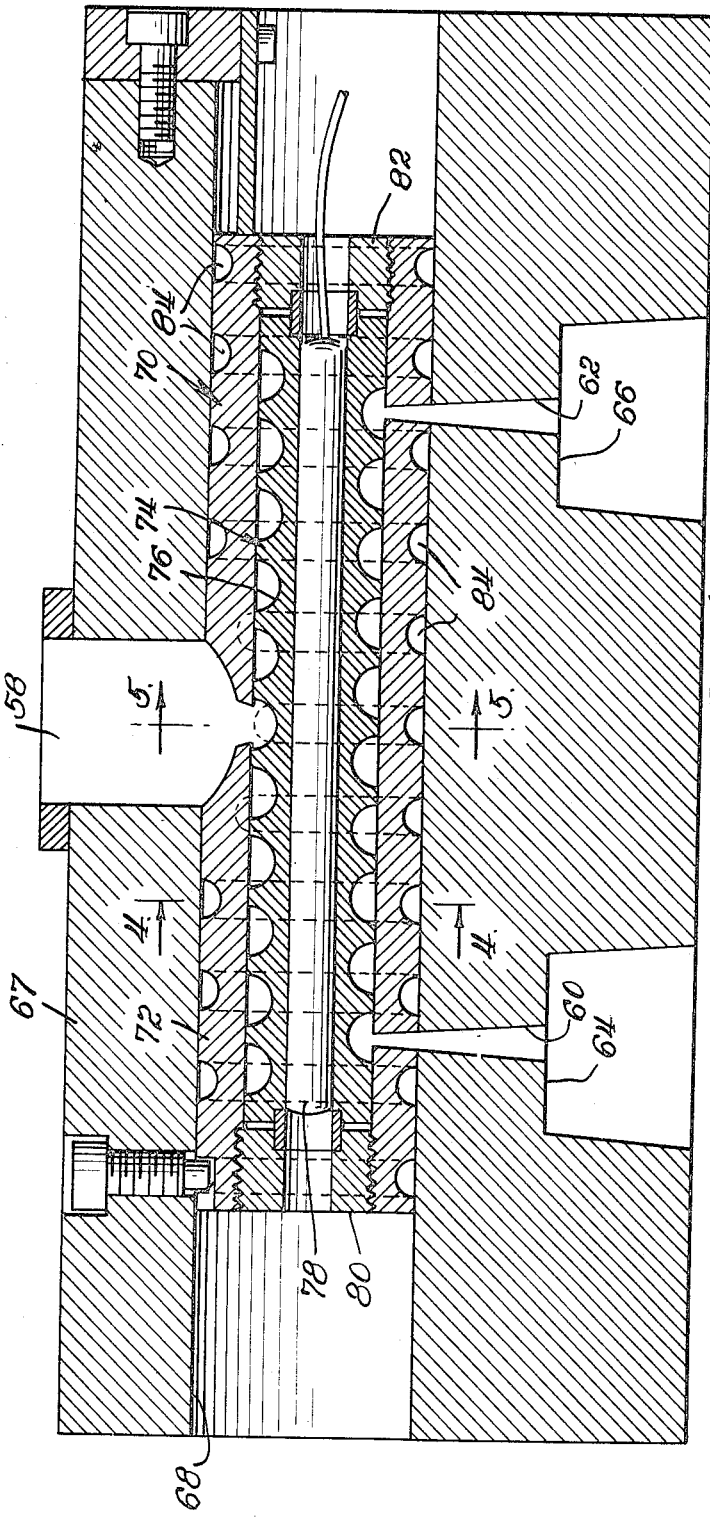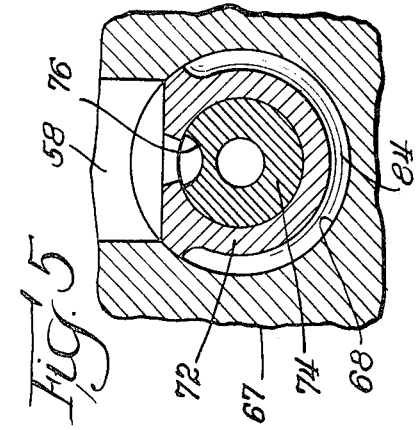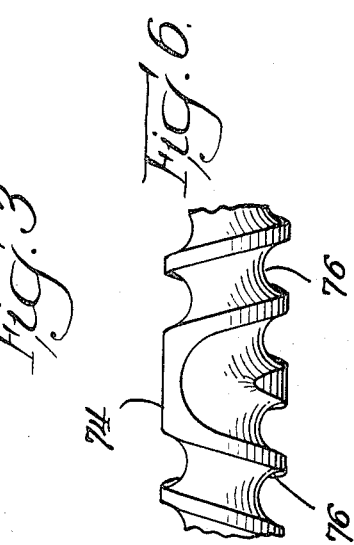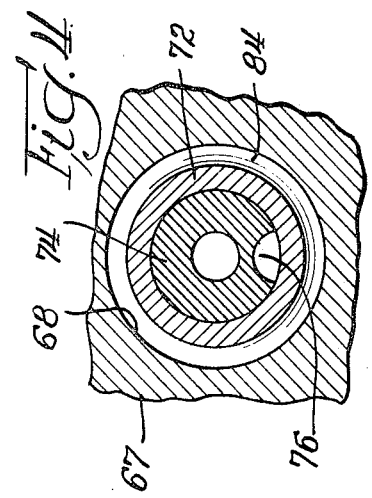

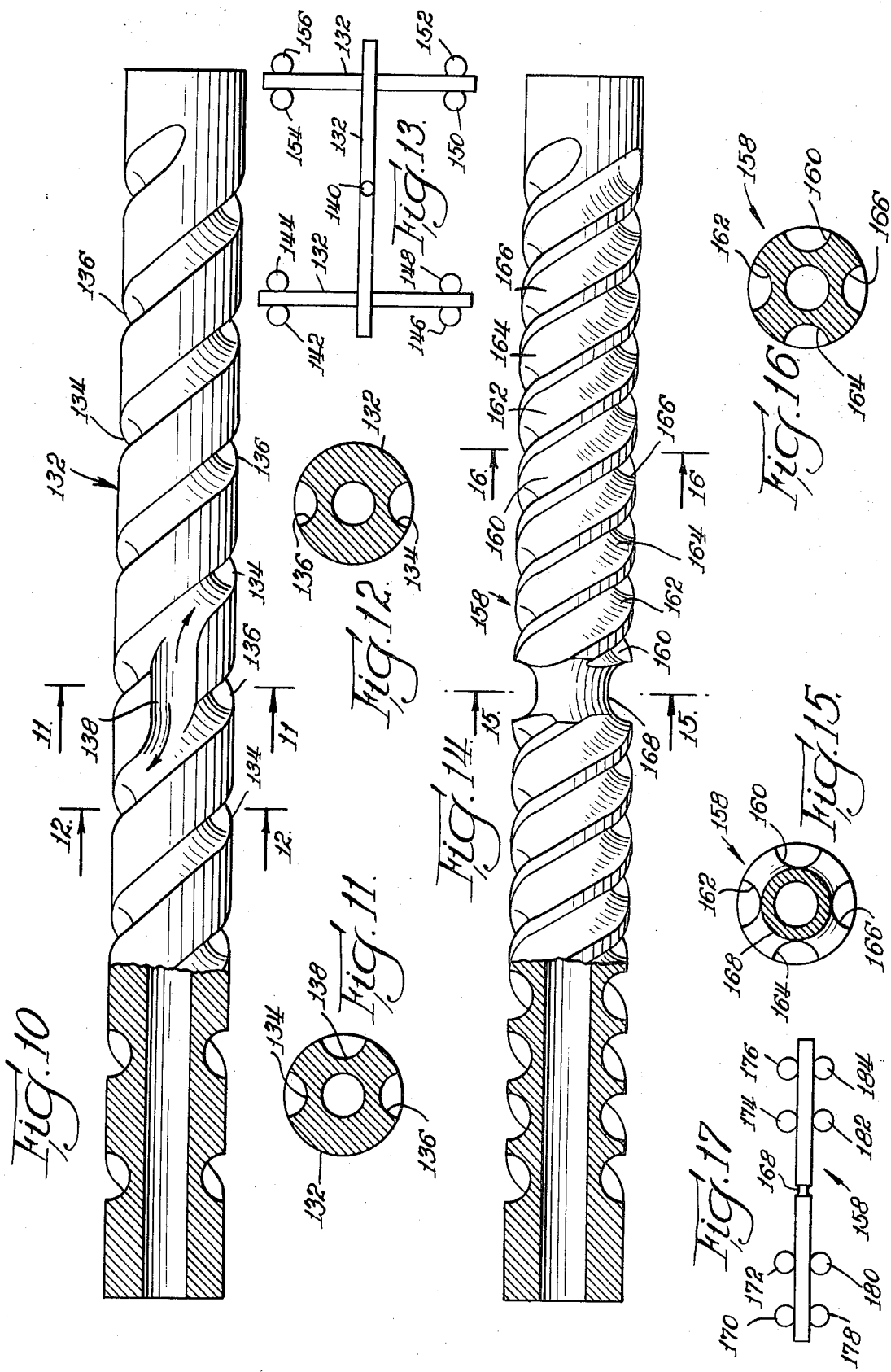

HEATED FEEDER SYSTEM FOR DIECASTING APPARATUS

BRIEF SUMMARY OF THE INVENTION

In the use of diecasting to manufacture plastic parts, it is sometimes useful to heat the metal die in order to maintain the plastic material in a molten condition until it reaches the die cavity, and it is known in the art to use heating electrode members for this purpose. In accordance with known practice, one or more heating electrode members are inserted in bores provided therefor in the metal die, thereby heating the die including the passageways through which the molten plastic material flows in order to pass through the die to the mold cavity therein. In other words, the known practice is to heat substantially the entire die, which of course automatically serves to heat the plastic material as it flows through the die to the die cavity.

It is a general object of the present invention to provide an improved feeder system for a die which serves to heat the passages through which the plastic material flows to reach the die cavity without heating the entire body of the die.

Another of my objects is to provide a feeder system as last above-mentioned which can if desired be utilized to heat substantially the entire length of the passageways for the plastic material from the nozzle where the plastic enters the die to the cavity where the plastic hardens to form a desired part.

A further object of the invention is to provide a heated feeder member in the nature of a screw comprising a rod having a helical sprue or feeder passage formed on the outside thereof and heating means contained within the rod.

Relative to the foregoing objective, it will be understood that in the diecasting of plastic it is necessary to maintain the plastic material within a predetermined temperature range so that the plastic is heated above its melting point but not above the temperature at which degradation begins to occur. The foregoing range will of course vary with different types of plastic material. However, by way of example, a plastic material may have a melting temperature of 275° F., and may become subject to degradation at a temperature of 375° F., in which case the temperature of the plastic while it is in the die should always be maintained in the foregoing range.

Thus, if the plastic material is allowed to be in the die for too long a time it will become overheated and subject to degradation, and it is therefore desirable once plastic material is fed into the die that it should be used with a predetermined time. For example, in certain applications it is considered desirable that the mold not contain more plastic material than will be utilized in the die cavity in three molding cycles, i.e., once plastic material enters the inlet to the mold it should be supplied to the die cavity and utilized within three molding operations. However, as indicated above the problem of degradation is much more critical with some plastic materials than with others, and consideration should be given to the particular plastic materials to be used when formulating the design of the die.

In accordance with the objective stated hereinabove, I provide a heated feeder screw member to control the flow of plastic material through the die to the mold cavity. That is, I provide a rod having one or more helical passages or sprues formed externally thereon, and I heat the rod by any suitable means, as for example by a heating electrode contained within the rod. With such an arrangement it is possible to vary the pitch of the helical passage, the depth of the passage and the diameter of the screw in order to control the amount of plastic material within the helical passageways and the time during which the plastic material is in effect stored or in melt within the die before being utilized in the mold cavity during a molding operation. In addition, it is possible to provide a screw having a plurality of sprues in the form of independent helical passageways formed thereon so that a single screw member may be utilized to supply plastic material to a plurality of different mold cavities.

The foregoing and other objects and advantages of my invention will be apparent from the following description thereof, taken in conjunction with the accompanying drawings.

DESCRIPTION OF THE DRAWINGS

FIG. 3 is a sectional view showing a modified form of the invention wherein a sleeve member is mounted in a bore formed in a manifold block and a heated feed screw is located within the sleeve;

FIG. 4 is a sectional view taken substantially along the line 4—4 of FIG. 3;

FIG. 5 is a sectional view taken substantially along the line 5—5 of FIG. 3;

FIG. 6 is a fragmentary elevational view of the feed screw of FIG. 3 illustrating how plastic material supplied by a nozzle to the center of the screw is divided and fed in two opposite directions toward the respective end portions of the screw;

FIG. 10 is an elevational view, partly in section, showing a modified form of feed screw in accordance with the present invention wherein the screw is provided with two independent sprues in the form of two lead threads formed on the screw;

FIG. 11 is a sectional view taken substantially along the line 11—11 of FIG. 10;

FIG. 12 is a sectional view taken substantially along the line 12—12 of FIG. 10;

FIG. 13 is a schematic view illustrating an H-shaped arrangement of one screw with a single lead thread and two screws with double lead threads utilized to supply plastic material from a common inlet to eight separate mold cavities;

FIG. 14 is an elevational view, partly in section, showing a modified form of feed screw in accordance with the invention wherein the screw is provided with four independent sprues in the form of four lead threads formed on the screw;

FIG. 15 is a sectional view taken substantially along the line 15—15 of FIG. 14;

FIG. 16 is a sectional view taken substantially along the line 16—16 of FIG. 14; and FIG. 17 is a schematic view showing the manner in which the multiple lead screw of FIG. 14 may be utilized to feed eight different mold cavities from a common inlet located adjacent the midportion of the screw.

Now, in order to acquaint those skilled in the art with the manner of making and using my invention, I shall describe, in conjunction with the accompanying drawings, certain preferred embodiments of the invention.

DETAILED DESCRIPTION OF THE INVENTION

Figure 1:
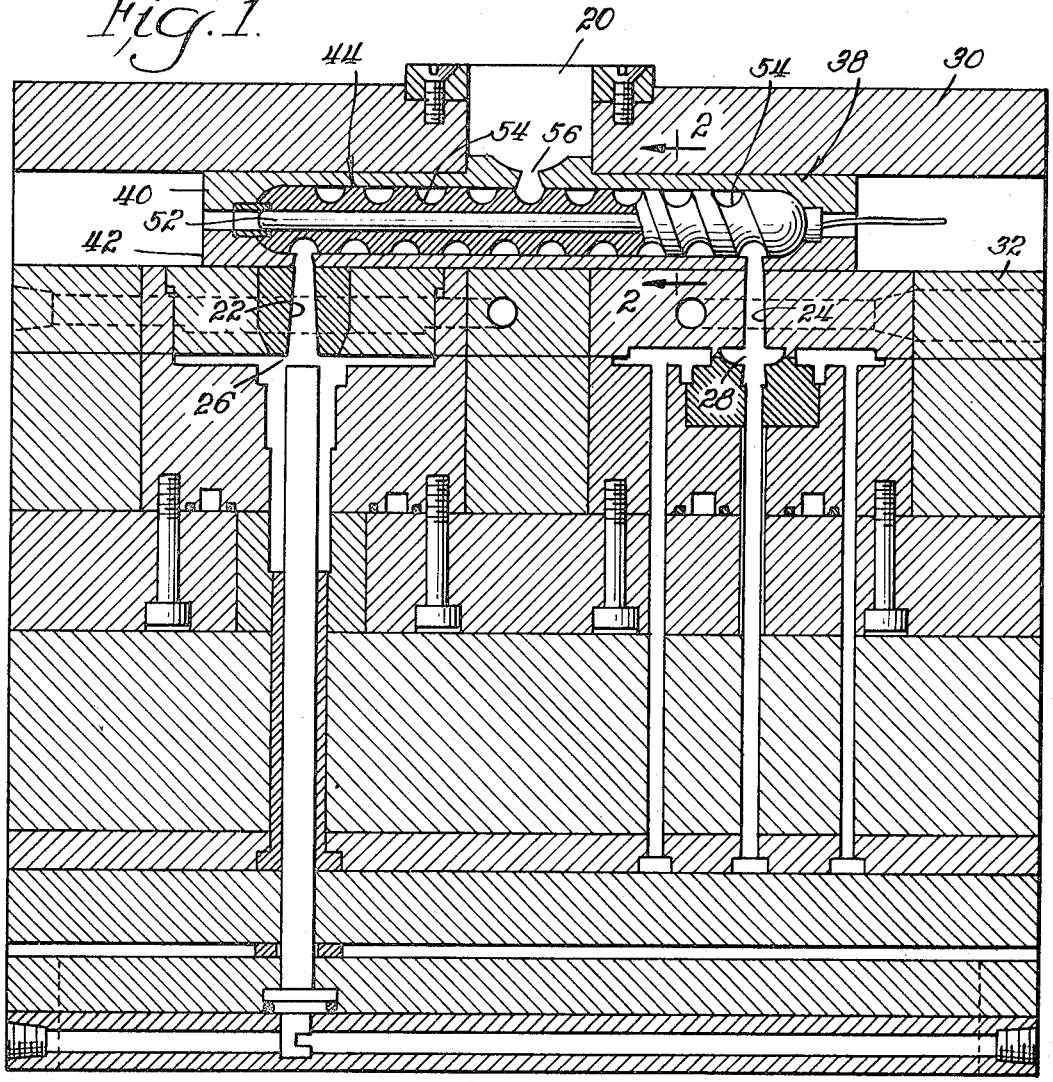
FIG. 1 is a sectional view of die casting apparatus having a feeder or runner system constructed in accordance with the present invention, the embodiment shown comprising a single feed screw member for feeding two mold cavities.
Figure 2:
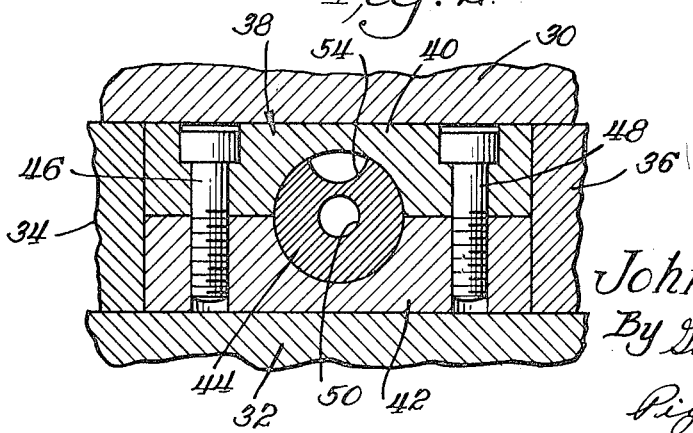
FIG. 2 is a fragmentary sectional view taken substantially along the line 2—2 of FIG. 1.

Referring now to the drawings, FIG. 1 shows a die assembly including an inlet 20 for molten plastic material and a pair of vertical feeder openings 22 and 24 which communicate with corresponding mold cavities 26 and 28. The upper portion of the die includes a pair of parallel spaced-apart plate members 30 and 32 which are removably connected to one another and which together with side plate members 34 and 36 (see FIG. 2) define a generally rectangular space for a manifold assembly 38. The manifold assembly 38 includes upper and lower manifold plates 40 and 42 which define therebetween a horizontal bore within which is mounted a feed screw 44 constructed in accordance with the present invention. The manifold plates 40 and 42 are removably connected together by cap screws 46 and 48 as shown in FIG. 2. The feeder screw 44 has a longitudinal bore 50 formed therein to accommodate heating means for heating the screw member, and in the embodiment shown in FIG. 1 a heating electrode 52 is positioned within the bore 50. However, it will be understood that various other heating means may be utilized, e.g., hot oil or water may be conducted through the bore 50 to heat the screw.

In the embodiment shown in FIG. 1, the screw 44 has a single lead helical thread or sprue 54 formed on the exterior thereof which extends for substantially the entire length of the screw and which communicates at the respective ends of the screw with the vertical passages 22 and 24 leading to the die cavities 26 and 28. Adjacent the midportion of the screw 44, the upper manifold plate 40 is provided with a passage 56 which communicates with the inlet 20.

It will be understood from the foregoing that molten plastic material supplied to the inlet 20 will be fed into the helical groove 54 and divided for delivery toward the opposite ends of the screw 44 and ultimately through the vertical passages 22 and 24 to the die cavities 26 and 28. The heating electrode member 52 will heat the screw 44 and maintain the plastic material in molten condition as it flows along the screw to the vertical feeder passages. With such an arrangement, the heating of the plastic material is accomplished without heating major portions of the die as is common in conventional heated die assemblies.

It is important to understand that the helical groove 54 formed in the screw 44 comprises an extremely advantageous arrangement because it affords a broad range of variables for control over the amount of plastic material which is contained in the screw and the time interval during which such material is stored in the screw before being conducted to the mold cavities for a molding operation. Thus, the pitch of the helical groove, the depth of the groove and the diameter of the screw 44 can each be designed to provide optimum results in a given application depending upon the weight and thickness of the piece part, the cycle time, the number of mold cavities and the distance from the inlet nozzle to the mold cavities. Such an improved runner system eliminates conventional three plate runner systems, hot runner plates and leaking of plastic out of runner systems as often occurs when the entire mold is heated. The foregoing improved runner system also minimizes startup time since it is not necessary to heat up major portions of the mold, and it permits a reduction in the molding cycle time so as to greatly improve automatic molding operations.

FIGS. 3–5 show a portion of a die assembly including an inlet 58 and a pair of vertical feeder openings 60 and 62 which communicate with respective mold cavities 64 and 66. The upper portion of the die block 67 has a horizontal bore 68 formed therein in which is mounted a manifold assembly 70. A steel sleeve 72 is mounted in the bore 68, and a feeder screw 74 is positioned within the sleeve, the screw having an external helical groove or sprue 76 formed therein and an internal heating electrode 78, substantially as in the embodiment of FIG. 1. A pair of threaded end plugs 80 and 82 maintain the screw 74 within the sleeve 72. It will be noted that the sleeve 72 is relieved on its external surface so as to reduce the area of contact between the sleeve and die block 67. In the embodiment shown, such relief is provided by forming a plurality of annular grooves 84 in the outer surface of the sleeve. It will be understood that the several annular grooves 84 need not communicate with one another since they do not serve as passageways for the plastic material.

The sleeve 72 described hereinabove serves the purpose of keeping the molten plastic material from directly engaging the die block 67, thereby maintaining the block in clean condition and minimizing damage thereto. The sleeve also tends to serve as an insulator so as to minimize conduction of heat to the block 67.

Figure 7:
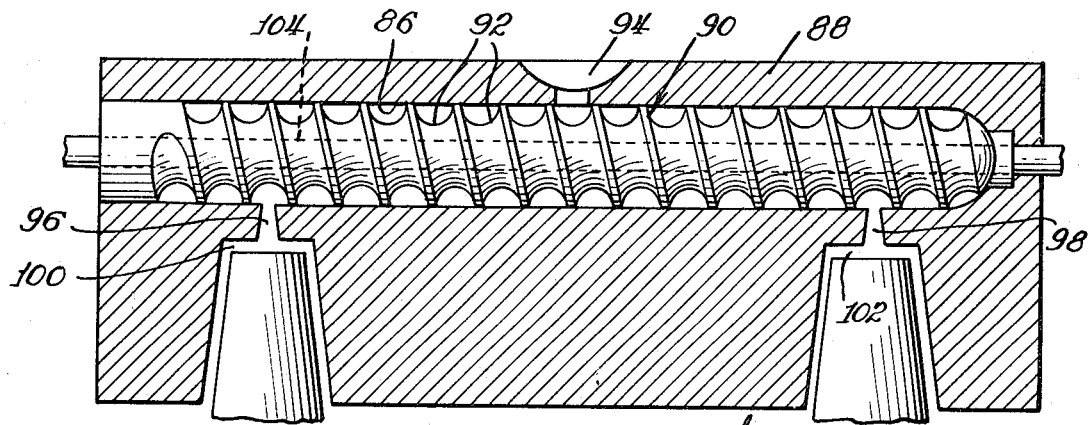
FIG. 7 is a sectional view illustrating the mounting of a feed screw member in a bore formed in a solid manifold block of a die, the feed screw being arranged for feeding plastic material from a common inlet to a pair of mold cavities.

FIG. 7 illustrates a solid manifold arrangement where a horizontal bore 86 is formed in a solid manifold block 88 and a feeder screw 90 is disposed within the bore and is provided with an external helical lead thread or sprue 92 which feeds plastic material from a common inlet 94 in the block 88 to a pair of vertical passages 96 and 98 leading to corresponding die cavities 100 and 102. As in the other embodiments, heating means such as a heating electrode 104 is provided within an internal bore formed in the screw feeder member. In many applications a solid manifold of the foregoing type will provide greater strength characteristics than a split manifold design.

Figure 8:
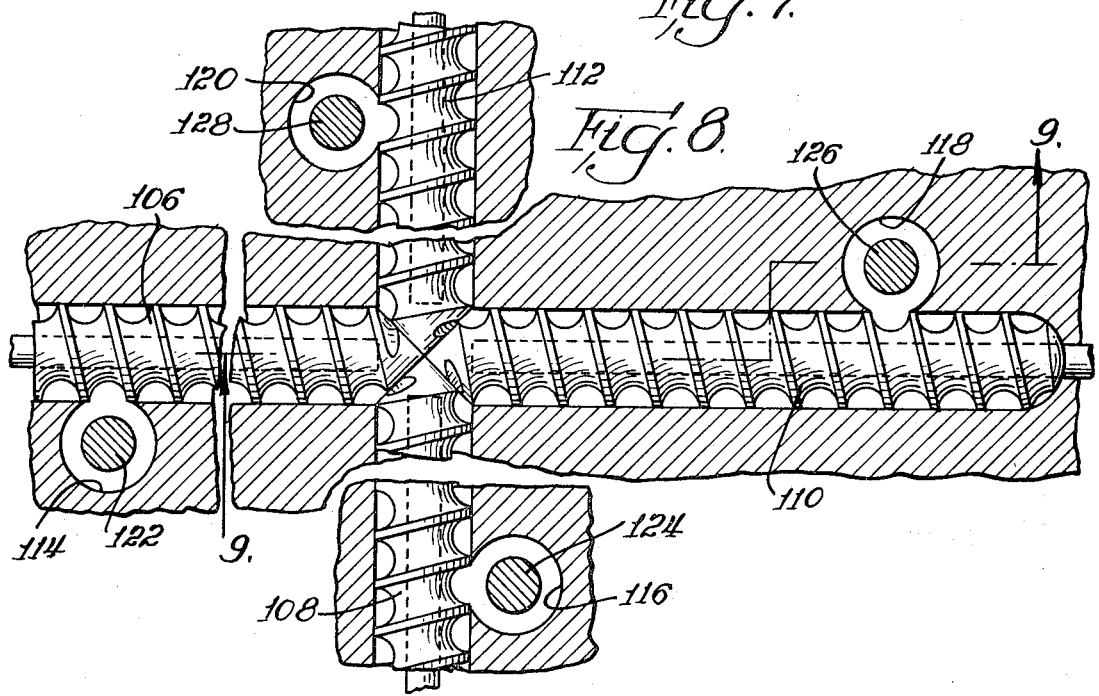
FIG. 8 shows a modified form of the invention where four feed screw members are arranged to intersect at a common inlet point and serve to feed plastic material from the inlet to four different mold cavities.
Figure 9:
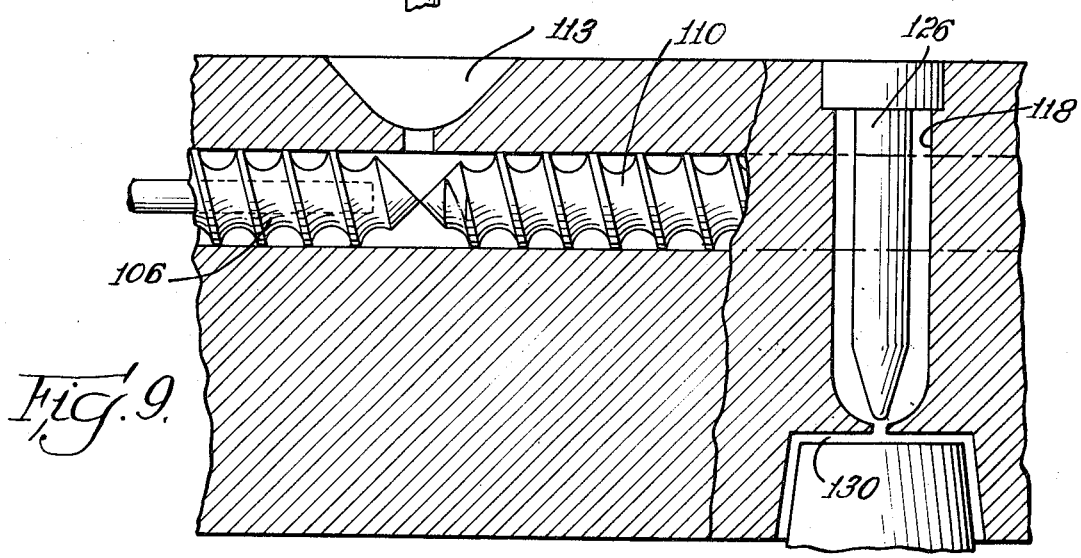
FIG. 9 is a sectional view taken substantially along the line 9—9 of FIG. 8.

FIGS. 8 and 9 illustrate the use of four feeder screws in combination to feed plastic material to four different mold cavities. The feeder screws 106, 108, 110 and 112 are arranged along two perpendicular axes so as to intersect at a common point. By locating a main inlet 113 at the point of intersection, it will be understood that plastic material may be supplied along the four screws to corresponding vertical passageways 114, 116, 118 and 120 leading to respective mold cavities. The foregoing screws are each of the type having a single lead, and in each instance the spiral passage or sprue communicates with a corresponding one of the vertical passages. In the particular embodiment shown, each of the vertical passages has a conventional heater probe located therein as shown at 122, 124, 126 and 128, such heater probes being of a diameter significantly less than the corresponding passages so as to allow space for the plastic material to flow around the outside of the heater probes to the respective mold cavities, one such cavity being shown at 130 in FIG. 9.

FIGS. 10–12 show a modified form of feeder screw 132 having two leads 134 and 136 which join at the midportion of the screw as shown at 138. Such a multiple sprue feeder screw can of course be utilized to feed an increased number of die cavities from a common inlet. For example, FIG. 13 illustrates schematically the manner in which three of the double lead feeder screws 132 may be combined in an H-shaped arrangement for feeding plastic material from a common inlet 140 to eight different vertical passages 142, 144, 146, 148, 150, 152, 154 and 156 which lead to corresponding mold cavities.

FIGS. 14–16 show still another modified form of feed screw 158 constructed in accordance with the present invention. The screw 158 is formed with four leads 160, 162, 164 and 166 which are independent from one another but intersect at the midportion of the screw as shown at 168.

FIG. 17 illustrates schematically the manner in which the four-lead feeder screw 158 may be utilized to feed plastic material from the common inlet 168 to eight different vertical passages 170, 172, 174, 176, 178, 180, 182 and 184 which lead to corresponding mold cavities.

While I have described my invention in certain preferred forms, modifications within the scope of my invention will readily occur to those skilled in the art, particularly with my disclosure before them. In particular, the term "heating means" should be interpreted broadly enough to include cooling means in any application where a thermosetting material is being used rather than a thermoplastic material is being used rather than a thermoplastic material for the reason that while the invention has been described primarily in connection with the molding of thermoplastic materials it may also be used to advantage in the molding of thermosetting materials. The term "diecasting" as used herein is intended to be synonymous with the terms mold or plastic mold and refers to a mold assembly for molding plastic parts.

I claim:
1. In a mold assembly for molding plastic parts, said assembly being of the type having an inlet for molten plastic material or the like and at least one mold cavity to which such molten material is conducted for a molding operation, an improved feeder system comprising in combination, manifold block means disposed within the mold assembly and having an elongated recess therein which communicates with an inlet passage for receiving molten plastic material and also communicates with a mold cavity, feeder means positioned within said elongated recess, said feeder means comprising a sta- tionary rod member having at least one external helical groove formed along the length thereof, said helical groove together with a surrounding wall of said elongated recess serving to define a helical passage for conducting molten plastic material from said inlet toward said mold cavity, said rod member having an internal aperture extending along the length thereof, and heating means disposed within said internal aperture for heating said rod member thereby heating plastic material which is conducted through said helical passage.

2. A feeder system as in claim 1 where said feeder means is disposed horizontally and where one end of said feeder means communicates with a generally vertical passage leading to said mold cavity.

3. A feeder system as in claim 1 where said feeder means is disposed horizontally with its midportion positioned to receive plastic material from an inlet passage and with each end of said feeder means in communication with a respective generally vertical passage leading to a corresponding mold cavity.

4. A feeder system as in claim 1 where said heating means comprises an electrical resistance unit disposed within a longitudinal bore formed in said feeder means.

5. A feeder system as in claim 1 where a plurality of independent helical grooves are formed in a single feeder means and arranged in communication with a common inlet passage for feeding plastic material to a plurality of corresponding mold cavities.

6. A feeder system as in claim 1 where said helical groove is approximately semicircular in its cross-sectional configuration.

7. A feeder system as in claim 1 where a tubular sleeve is disposed in said elongated recess and said feeder means is disposed in said elongated recess and said feeder means is disposed within said tubular sleeve.

8. A feeder system as in claim 7 where said tubular sleeve is relieved over a portion of its exterior surface to reduce surface area contact between said sleeve and said manifold block means.

9. A feeder system as in claim 1 here a plurality of said feeder means are arranged in intersecting relation with the point of intersection thereof located in communication with a common inlet passage.

10. In a mold assembly for molding plastic parts, said assembly being of the type having an inlet for molten plastic material or the like and at least one mold cavity to which such molten material is conducted for a molding operation, an improved feeder system comprising, in combination, manifold block means disposed within the mold assembly and having an elongated recess therein which recess is circular in cross-sectional configuration and communicates with an inlet passage for receiving molten plastic material and also communicates with a mold cavity, feeder means positioned in close fitting relationship in said elongated recess, said feeder means comprising a stationary rod member having at least one external helical groove formed along the length thereof, said helical groove together with a surrounding wall of said elongated recess serving to define a helical passage for conducting molten plastic material from said inlet toward mold cavity, a longitudinal bore formed in said rod member, and heating means located in said longitudinal bore for heating said rod member thereby heating plastic material which is conducted through said helical passage.

11. A feeder system as in claim 10 where said feeder means is disposed horizontally with at least one end of said feeder means in communication with a vertical passage leading to a corresponding mold cavity, and where said heating means comprises an electrical resistance unit disposed within said longitudinal bore.

* * * * *